United States Patent [19]
White et al.

[11] Patent Number: 5,721,427
[45] Date of Patent: Feb. 24, 1998

[54] SCENE-BASED NONUNIFORMITY CORRECTION PROCESSOR INCORPORATING MOTION TRIGGERING

[75] Inventors: Spencer W. White, Los Angeles; Donald F. King, Playa Del Rey, both of Calif.

[73] Assignee: Hughes Electronics, Los Angeles, Calif.

[21] Appl. No.: 769,558

[22] Filed: Dec. 19, 1996

[51] Int. Cl.$^6$ .................................................. G12B 13/00
[52] U.S. Cl. ............................ 250/252.1 R; 250/332
[58] Field of Search ........................ 250/252.1 R, 332

[56] References Cited

U.S. PATENT DOCUMENTS 5,604,347   2/1997   Petrick et al. .................. 250/252.1 R

*Primary Examiner*—Don Wong
*Attorney, Agent, or Firm*—Gordon R. Lindeen, III; Michael W. Sales; Wanda K. Denson-Low

[57] ABSTRACT

A nonuniformity correction processor (30) adapted for use with a focal plane array of detectors. The inventive processor (30) includes a nonuniformity correction circuit (32, 38, 42, 53, 54, 56, 58) for generating current nonuniformity correction terms (32) and applying the terms to information (26) received from the scene via the focal plane array of detectors. A triggering circuit (44) selectively enables the nonuniformity correction circuit (32, 38, 42, 53, 54, 56, 58) in response to a motion signal (50) from a motion detector (40, 46, 48, 52). In a specific embodiment, the nonuniformity correction circuit (32, 38, 42, 53, 54, 56, 58) further includes a filtering circuit (38) for generating intermediate nonuniformity correction terms (42, 53) in response to the scene information (26) received from the focal plane array of detectors. In the illustrative embodiment, the nonuniformity correction circuit (32, 38, 42, 53, 54, 56, 58) further includes an updating circuit (32, 53, 54, 56, 58) for providing and storing the current correction terms (32). Current correction terms (32) are obtained from a combination of the intermediate nonuniformity correction terms (42, 53) and pre-existing correction terms (56) stored in the updating circuit (58). The motion detector (40, 52) includes an external motion input signal (52) and a scene motion detection circuit (40). The scene motion detection circuit (40) includes a circuit for testing pixels and counting the number of pixels that differ from a predetermined pixel value by a predetermined threshold. The triggering circuit (44) includes a pass gate (44) having the motion signal (50), and the intermediate correction terms (42) as inputs. The output (53) of the triggering circuit (44) is connected to the updating circuit (32, 53, 54, 56, 58) which computes current correction terms from the intermediate correction terms (32) and pre-existing correction terms (56) when the output of the pass gate (44) is activated via the motion signal (50).

22 Claims, 2 Drawing Sheets

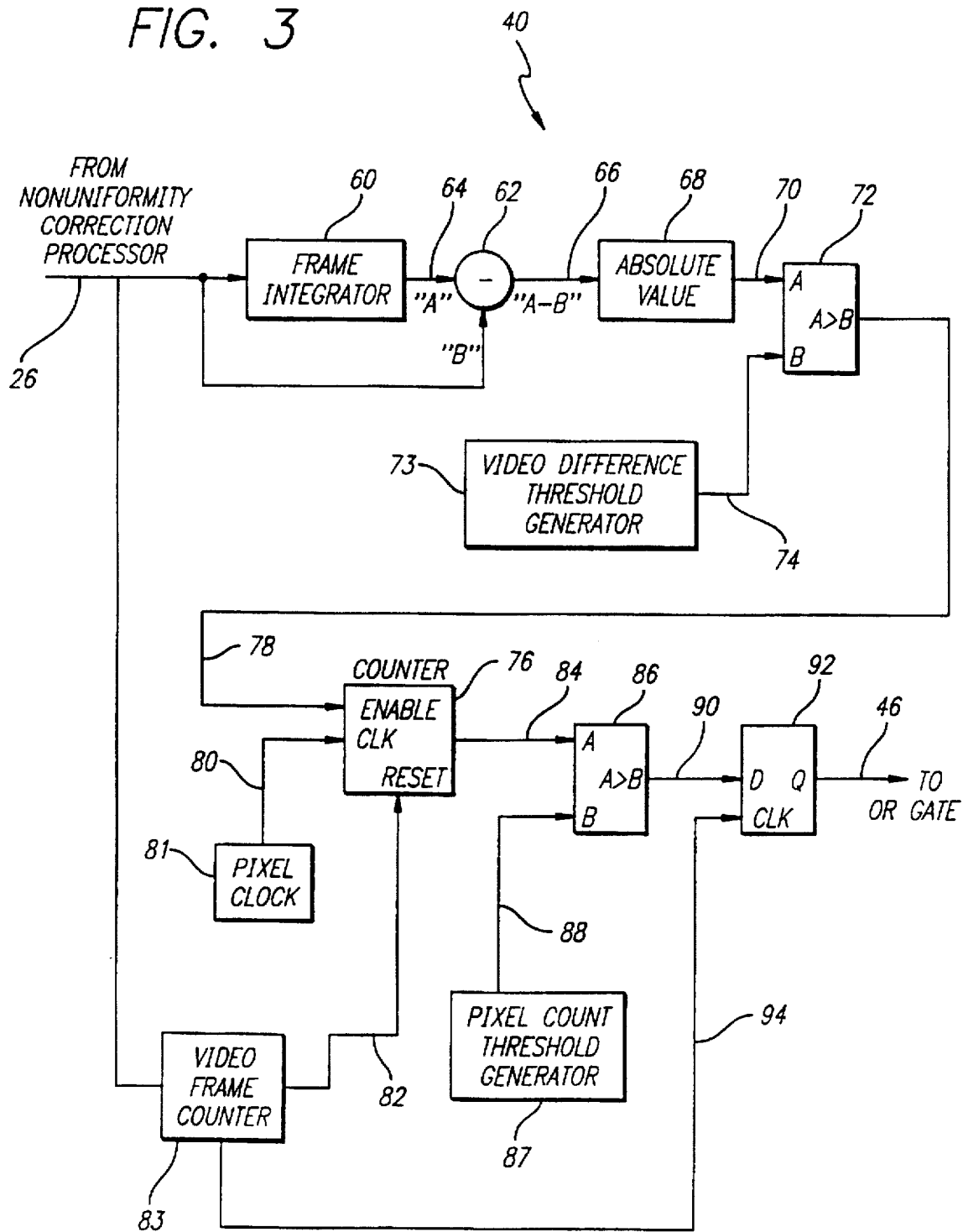

SCENE-BASED NONUNIFORMITY CORRECTION PROCESSOR INCORPORATING MOTION TRIGGERING

BACKGROUND OF THE INVENTION

1. Field of Invention

This invention relates to imaging systems. Specifically, the present invention relates to systems for correcting image nonuniformities in images obtained from focal plane arrays of infrared imaging systems.

2. Description of the Related Art

Infrared imaging systems are used in a variety of demanding applications ranging from night vision systems to target detection systems. Such applications often require very detailed and accurate information.

Infrared imaging systems include focal plane arrays for detecting thermal energy and electronics for processing resulting thermal patterns. Focal plane arrays typically include thousands of infrared photon detectors. Not all detectors have the same sensitivity to incoming thermal energy. As a result, an uncompensated image from a focal plane array will have fixed-pattern noise manifesting itself as differences in pixel intensity, even when viewing a uniform scene.

A variety of systems and methods exist for correcting nonuniformities in focal plane array images, including source-based and scene-based correction systems. Source-based systems apply static correction coefficients to detector signals. The coefficients are determined in a calibration procedure in which the focal plane array is exposed to different incident flux levels. However, due to nonlinearities in detector responses, fixed-pattern noise occurs when the focal plane array is exposed to flux levels different from those used in the calibration procedure. Additional fixed-pattern noise results from detector aging and changes in the operating environment of the focal plane array.

To reduce such fixed-pattern noise, adaptive scene-based nonuniformity correction systems were developed. These systems continually update correction coefficients as required by changing conditions. Such scene-based systems use information from the scene being imaged to determine correction coefficients. First order coefficients determined through source-based calibration are often applied in addition to the second order scene-based coefficients.

Scene-based systems typically require line-of-sight motion to distinguish fixed-pattern noise from details of the scene being imaged. Since fixed-pattern noise remains in the same location when the scene moves, the noise is distinguishable from moving scene details. When line-of-sight motion is not present, scene-based systems may confuse scene details with fixed-pattern noise resulting in image degradation. This limits the applicability of such scene-based systems to applications where the scene is always moving such as in high speed missile and aircraft applications.

To overcome these inherent limitations in early scene-based nonuniformity correction processing, approaches which ensured sufficient scene motion were developed. The approaches include the use of complicated electronics and control circuitry for generating scene motion by moving the scene image relative to the focal plane array or by dithering focusing optics. Additional circuitry is required for compensating the resulting image for the induced scene motion. Such compensation is difficult and may result in image artifacts when certain scene details are moving relative to the scene itself. Such systems are expensive and reliability problems exist due to extra moving parts.

Hence, a need exists in the art for a cost-effective, reliable scene-based nonuniformity correction system that does not degrade scene details when the scene is stationary. There is a further need for a system that continually corrects for focal plane array nonuniformities as required by changing conditions.

SUMMARY OF THE INVENTION

The need in the art is addressed by the scene-based nonuniformity correction processor of the present invention. In the illustrative embodiment, the inventive processor is adapted for use with a two-dimensional staring focal plane array of detectors and includes a scene-based nonuniformity correction circuit for generating current scene-based nonuniformity correction terms and applying the terms to information received from the scene via the focal plane array of detectors. A triggering circuit selectively enables the scene-based nonuniformity correction circuit to update the current scene-based nonuniformity correction terms in response to a motion signal from a motion detector. By utilizing native scene motion to trigger the nonuniformity correction updating process, limitations of previous nonuniformity correction systems are avoided.

In a specific embodiment, the scene-based nonuniformity correction circuit further includes a filtering circuit for generating intermediate scene-based nonuniformity correction terms in response to the scene information. The intermediate scene-based nonuniformity correction terms are dynamic second order terms that account for changing scene conditions.

In the illustrative embodiment, the scene-based nonuniformity correction circuit further includes an updating circuit for providing and storing the current correction terms. The current correction terms are obtained from a combination of the intermediate scene-based nonuniformity correction terms and pre-existing correction terms stored in the updating circuit's memory.

The motion detector includes an external motion input signal and a scene motion detection circuit. The output of the motion detection circuit is connected to one input of an OR gate having the external motion input signal as a second input. The output of the OR gate corresponds to the motion signal and is input to the triggering circuit. The scene motion detection circuit includes a circuit for testing pixels and counting the number of pixels that differ from a predetermined pixel value by a predetermined threshold. The predetermined pixel value is the average pixel value of a given pixel under test in a pre-determined number of image frames.

The triggering circuit includes a pass gate having the motion signal, and the intermediate correction terms as inputs. The output of the triggering circuit is connected to the updating circuit which computes current correction terms from the intermediate scene-based correction terms and pre-existing correction terms when the output of the pass gate is activated via the motion signal.

BRIEF DESCRIPTION OF THE DRAWINGS

FIG. 3 is a schematic of the scene detector of FIG. 2.

DESCRIPTION OF THE INVENTION

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

Figure 1:
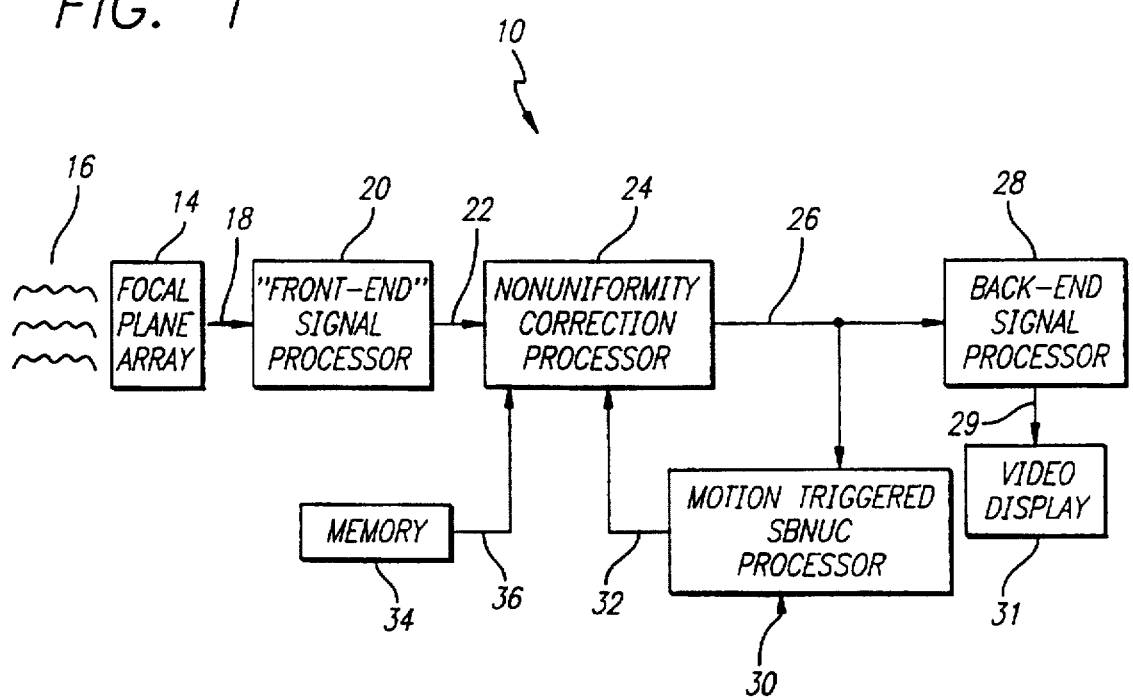
FIG. 1 is a schematic of an imaging system constructed in accordance with the teachings of the present invention and having a scene-based nonuniformity correction processor.

FIG. 1 is a schematic of an imaging system constructed in accordance with the teachings of the present invention and having a scene-based nonuniformity correction processor. The imaging system 10 includes a focal plane array 14 of photon detectors that detects incoming electromagnetic energy signals 16 and converts the signals 16 into a first electronic video data stream 18. Video data from the first video data stream 18 is then processed by a front-end signal processor 20. The processor 20 applies "global" offset and/or responsivity values to the video data that are identical for all detectors (not shown) in the focal plane array 14. A processed video data stream 22 is output from the processor 20 and provides input to a nonuniformity correction processor 24.

The nonuniformity correction processor 24 performs correction processing to information contained in the processed video data stream 22. Correction processing performed in the processor 24 accounts for different response characteristics inherent in the focal plane array's 14 individual detectors. Unique offset and responsivity correction terms may be applied to each pixel (not shown) to equalize detector responses.

A corrected video data stream 26 output from the nonuniformity correction processor 24 provides input to a scene-based nonuniformity correction processor (SBNUC) 30 and a back-end signal processor 28. The back-end processor 28 performs final signal processing before the display of video data contained in the corrected video data stream 26. For illustrative purposes, an output 29 from the back-end signal processor is input to a video display 31 where video data representative of the electromagnetic energy 16 is displayed.

The nonuniformity correction processor 24 utilizes pre-determined static correction terms 36 stored in a memory circuit 34. The static correction terms aim to eliminate first order nonuniformities and are determined in a calibration procedure known in the art which equalizes detector responses when the focal plane array 14 is exposed to electromagnetic energy 16 having a uniform flux.

The scene-based nonuniformity correction processor 30 receives the corrected data stream 26 and provides current scene-based nonuniformity correction terms 32 to the nonuniformity correction processor 24. The current scene-based nonuniformity correction terms 32 are updated only when the scene (not shown) corresponding to the electromagnetic energy 16 is moving. A scene motion detector (not shown) and an external motion control signal (not shown) are used to activate the dynamic action of the scene-based nonuniformity processor 30 when the scene is moving. This prevents the processor 30 from degrading scene features or details when the scene is not moving as happens with conventional scene-based nonuniformity correction circuits. This also increases the applicability of the system 10 to applications involving stationary scenes such as tactical vehicle imaging systems.

The current scene-based nonuniformity correction terms 32 are updated in near-real-time by the scene-based nonuniformity correction processor 30 in response to a changing scene environment as communicated via the corrected video data stream 26. The current scene-based correction terms 32 augment the pre-determined static correction terms 36 stored in the memory circuit 34. The correction processor 24 applies both static and "dynamic" scene-based correction terms to the processed video data stream 22 to produce the corrected video data stream 26 that is then input back into the scene-based nonuniformity correction processor 30 for any further correcting, and so on. In this way fixed-pattern noise due to differences in individual detector responses of the focal plane array 14 is minimized. In an alternative embodiment, static correction terms are not used. Instead, first and higher order correction terms are all determined in real time and applied to the processed video data stream 22 in one of the nonuniformity correction processors 24, 30.

The focal plane array 14, the front-end signal processor 20, the nonuniformity correction processor 24, the back-end signal processor 28, the video display 31, and the memory 34 are conventional devices and modules. The scene-based nonuniformity correction processor 30 has a unique design as disclosed in FIG. 2.

Figure 2:
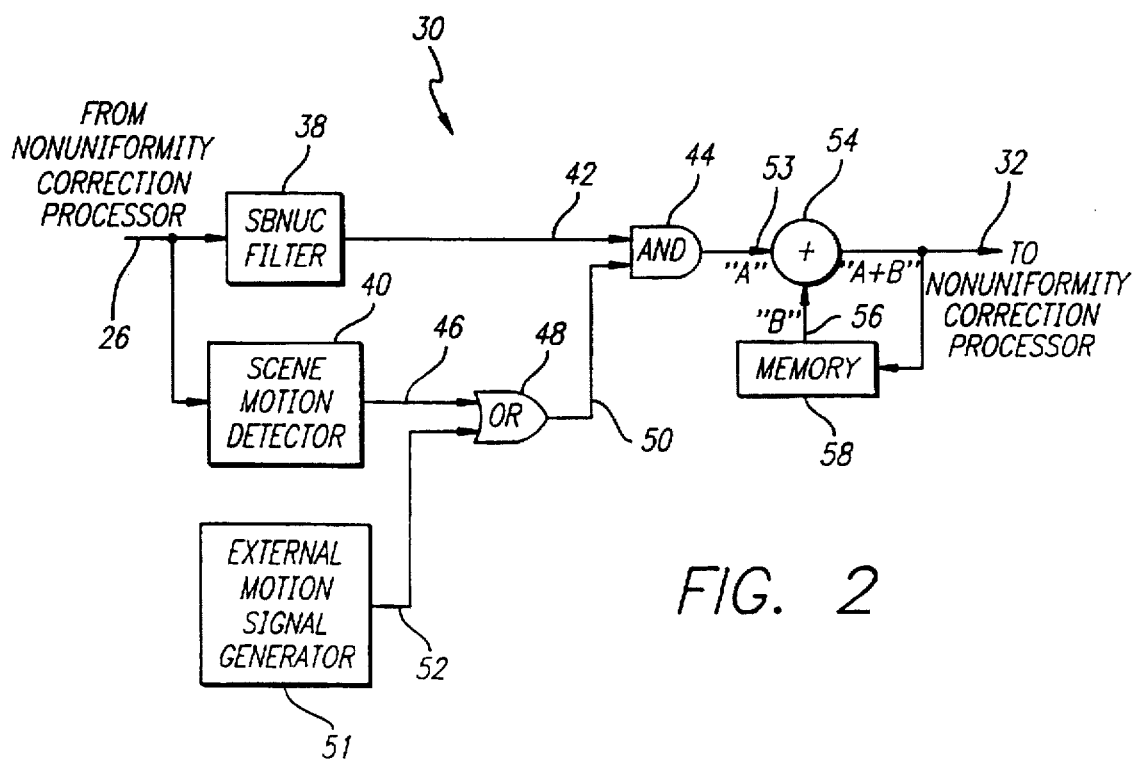
FIG. 2 is a schematic of the scene-based nonuniformity correction processor of FIG. 1 incorporating a scene motion detector.

FIG. 2 is a schematic of the scene-based nonuniformity correction processor of FIG. 1 incorporating a scene motion detector. The scene-based nonuniformity correction processor 30 includes a scene-based nonuniformity correction (SBNUC) filter 38 and a scene motion detector 40 that receive the corrected video data stream 26. The filter 38 is a conventional scene-based nonuniformity correction filter that provides intermediate scene-based correction terms 42 to an input of an AND gate 44. The intermediate scene-based correction terms 42 account for changing scene conditions. Those skilled in the art will appreciate that the AND gate 44 may be replaced by a pass gate without departing from the scope of the present invention.

The scene motion detector 40 receives information about the scene (not shown) via the video data stream 26 and determines if the scene has sufficient motion to enable the intermediate correction terms 42 to update the previously generated scene-based correction terms 56. In the present specific embodiment, a scene motion signal 46 that is output from the detector 40 is input to an OR gate 48. The OR gate 48 also has an external motion input signal 52 as an input from an external motion signal generator 51. The external generator 51 may correspond to an aiming system servo circuit in a missile system.

Those skilled in the art will appreciate that the external motion signal 52 and the OR gate 48 are not required for the present invention; a scene-motion detector alone is sufficient. The depiction of both a scene motion detector circuit and an external motion signal are intended to demonstrate two possible independent origins for a satisfactory motion-triggering signal. Either one alone could be acceptable depending on the specifics of the application.

The external input signal 52 may provide movement information from any actuators (not shown) that control movement of the focal plane array (see FIG. 1). If one or both of the input signals 46, 52 to the OR gate 48 signal that sufficient scene motion is present, the OR gate 48 will provide a motion control signal 50 to an input of the AND gate 44 specifying that sufficient scene motion is present to enable intermediate scene-based correction terms 42 to update the previously generated scene-based correction terms 56.

In the present specific embodiment, a high voltage state at the output of the OR gate 48 corresponds to a motion-present motion control signal 50. When the motion control signal 50 is high, i.e., sufficient scene motion is present, an output 53 of the AND gate 44 will correspond to the intermediate scene-based correction term updates 42 input to the AND gate 44. The output 53 represents gated scene-based correction term updates.

Gated scene-based correction term updates 53 are input to a conventional adder 54 that also has previously generated scene-based correction terms 56 as input. The previously generated scene-based correction terms 56 are stored in a conventional memory device 58. Output from the adder 54 represents current scene-based correction terms 32 that are a combination of the gated scene-based correction term updates 53 and the previously generated scene-based correction terms 56. The current scene-based correction terms 32 are input to the memory device 58 for storage until required for another iteration.

FIG. 3 is a schematic of a representative scene motion detector circuit 40 depicted in FIG. 2. The scene motion detector 40 includes a frame integrator 60 and a conventional subtractor 62 that receive the current video data stream 26 as input. The frame integrator 60 computes a running frame average 64 of current and previous video frames from information provided by the current video data stream 26. The running frame average 64 contains information pertaining to the average video level for each pixel in the video frame and is also input to the subtractor 62. The subtractor 62 computes a difference 66 between video levels of the running frame average 64 and the current video frame as input by the video data stream 26. The difference 66 contains information pertaining to the difference between the average video level and the current video level for each pixel in the current video frame. The difference 66 is then input into a conventional absolute value computation circuit 68 that provides the absolute value of the difference 66 to a video difference comparator 72 via a video difference signal 70. The absolute value computation circuit 68 calculates the magnitude of the difference between the average video level and the current video level for each pixel in the current video frame.

The video difference comparator 72 has an additional input 74 corresponding to a pre-determined programmable video threshold from a video difference threshold generator 73. An appropriate video threshold is determined through experimentation and is used to set the generator 73 or is determined via a specialized algorithm running on the generator 73. The threshold is set so that temporal noise characteristics of the imaging system and surrounding environment do not cause static pixels to be misconstrued. The comparator 72 compares the video difference 70 for each pixel to the programmable video threshold 74. If the video difference 70 exceeds the threshold 74 then a counter 76 is enabled via a comparator output 78. If the video difference 70 is less than or equal to the video threshold 74 then the counter 76 is not enabled. A counter enabling signal at the output 78 of the comparator signifies scene motion has taken place sufficient to cause the video difference 70 of a particular pixel to exceed the threshold 74. However, this scene motion may not be sufficient to require activating of the scene motion detection circuit 40 of FIG. 2.

The counter 76 has a conventional pixel clock signal 80 from a pixel clock 81 and a start of video frame signal 82 from a video frame counter 83 as additional inputs. The video frame counter 83 processes the data stream 26 to determine when one video frame begins and another one ends.

When the start of a video frame is encountered, the signal 82 resets an in-motion pixel count stored in the counter 76. During a video frame, the pixel clock 81 triggers an increment of the in-motion pixel count stored in the counter 76 for each pixel having a video difference 70 that enables the counter 76. An output 84 of the counter 76 corresponding to the in-motion pixel count provides input to a pixel count comparator 86. Those skilled in the art will appreciate that not all the pixels in a given frame must be counted by the counter 76.

The pixel count comparator 86 has an additional input 88 corresponding to a pre-determined programmable pixel count threshold from a pixel count threshold generator 87. An appropriate pixel count threshold is determined through experimentation and is used to set the generator 87, or through the use of a specialized algorithm running on the generator 87. The threshold 88 may be different for different applications. The in-motion pixel count 84 is compared to the programmable pixel count threshold 88 by comparator 86. If the pixel count 84 exceeds the threshold 88, then the current video frame has sufficient motion to enable the intermediate scene-based correction terms 42 of FIG. 2 to update the previously generated scene-based correction terms 56. In this case, an in-motion signal will be transferred to the input of a status register 92 via a comparator output 90. In the present specific embodiment, the status register is a D flip-flop of conventional design.

Those skilled in the art will appreciate that different circuits and coding schemes may be used for the motion detection circuit 40 without departing from the scope of the present invention.

In the present specific embodiment, a high voltage state at the output 90 corresponds to an in-motion signal, and a low voltage state at the output 90 corresponds to a not-in-motion signal.

The status register 92 includes an end of video frame signal 94 from the video frame counter 83 as an additional input. When the end of a video frame is detected, the end of video frame signal 94 clocks the value at the output 90 into the status register 92 and provides the scene motion signal 46. Hence, each current video frame has its own motion status value depending on whether or not the video frame is sufficiently moving to enable scene-based nonuniformity correction updates. This value corresponds to the scene motion signal 46.

The modules and components used in the motion detection circuit 40 are modules and components of conventional design, however those skilled in the art will appreciate that inventive modules and components may be used in place of the conventional modules without departing from the scope of the present invention. Similarly, functions performed by the components depicted in the schematic diagram of FIG. 1 may be reallocated to different components. For example, rather than feeding back current scene based correction terms to the nonuniformity correction processor 24 on line 32, the SBNUC processor 30 could perform the corrections and feed the data to the video signal processor 28 directly.

Thus, the present invention has been described herein with reference to a particular embodiment for a particular application. Those having ordinary skill in the art and access to the present teachings will recognize additional modifications applications and embodiments within the scope thereof.

It is therefore intended by the appended claims to cover any and all such applications, modifications and embodiments within the scope of the present invention.

Accordingly,

What is claimed is:

1. A nonuniformity correction processor for correcting information received from a scene via an array of energy detectors comprising:

nonuniformity correction means for generating current nonuniformity correction terms and applying said terms to said information;

motion detection means for determining when said scene is moving and for providing a motion signal in response thereto; and triggering means for selectively enabling said nonuniformity correction means in response to said motion signal.

2. The invention of claim 1 wherein said nonuniformity correction terms are dynamic terms that account for changing scene conditions.

3. The invention of claim 1 wherein said nonuniformity correction means includes filtering means for generating intermediate nonuniformity correction terms in response to said information received from said array energy detectors.

4. The invention of claim 3 wherein said nonuniformity correction means further includes updating means for providing and storing said current correction terms.

5. The invention of claim 4 wherein said current correction terms are obtained from a combination of said intermediate nonuniformity correction terms and pre-existing correction terms stored in said updating means.

6. The invention of claim 5 wherein said combination is performed by an adder.

7. The invention of claim 4 wherein said updating means includes a memory device for storing correction terms.

8. The invention of claim 1 wherein said motion detection means includes an external motion input signal.

9. The invention of claim 1 wherein said motion detection means includes a scene motion detection circuit.

10. The invention of claim 9 wherein the output of said motion detection circuit is connected to one input of an OR gate having an external motion input signal as a second input.

11. The invention of claim 10 wherein the output of said OR gate is input to said triggering means.

12. The invention of claim 9 wherein said scene motion detection circuit includes means for testing pixels and providing a count of the number of pixels that differ from a predetermined pixel value by a predetermined threshold.

13. The invention of claim 12 wherein said predetermined pixel value is the average pixel value of a given pixel under test in a pre-determined number of image frames.

14. The invention of claim 12 wherein said predetermined threshold is a difference video threshold.

15. The invention of claim 12 wherein said difference video threshold is programmable.

16. The invention of claim 12 wherein said means for testing and counting includes a pixel count threshold comparator for comparing said count of pixels to a predetermined pixel count threshold.

17. The invention of claim 16 wherein said pixel count threshold is programmable.

18. The invention of claim 1 wherein said triggering means includes a first gating device having said motion signal, and said intermediate correction terms as inputs and having an output connected to an updating means for providing and storing said current correction terms, said updating means included in said nonuniformity correction means.

19. The invention of claim 18 wherein said gating device is an AND gate.

20. The invention of claim 18 wherein said gating device is a pass gate.

21. A processor for improving nonuniformity correction of an imaging system having energy detectors that provide data corresponding to a scene comprising:

filtering means for generating intermediate nonuniformity correction terms in response to said data received from said detectors;

updating means for providing and storing new correction terms utilizing said intermediate correction terms and pre-existing correction terms stored in a memory;

motion detection means for determining when said scene is moving;

triggering means for selectively enabling said filtering means and said updating means in response to information received from said motion detection means.

22. An imaging system for obtaining information from stationary and moving scenes via an array of energy detectors comprising:

nonuniformity correction means for providing image correction terms in response to said information;

signal processing means for processing said information, applying said correction terms to said information and for providing an output signal in response thereto;

triggering means for detecting scene motion and selectively enabling said nonuniformity correction means when scene motion is present; and display means for displaying information in accordance with said output signal.

* * * * *